(12) United States Patent
Fu et al.

(10) Patent No.: US 12,157,356 B2
(45) Date of Patent: Dec. 3, 2024

(54) MOUNTING STRUCTURE FOR PICKUP BED COVER

(71) Applicant: HANGZHOU GOLDEN SUN AUTO PARTS CO., LTD., Hangzhou (CN)

(72) Inventors: Jinqin Fu, Hangzhou (CN); Chenshan Lin, Hangzhou (CN); Xue'e Wang, Hangzhou (CN); Xiaohong Tang, Hangzhou (CN)

(73) Assignee: HANGZHOU GOLDEN SUN AUTO PARTS CO., LTD., Hangzhou (CN)

( * ) Notice: Subject to any disclaimer, the term of this patent is extended or adjusted under 35 U.S.C. 154(b) by 216 days.

(21) Appl. No.: 17/812,134

(22) Filed: Jul. 12, 2022

(65) Prior Publication Data

US 2023/0382206 A1    Nov. 30, 2023

(30) Foreign Application Priority Data

May 24, 2022   (CN) .......................... 202221273494.7

(51) Int. Cl.
*B60J 7/14* (2006.01)
(52) U.S. Cl.
CPC ..................................... *B60J 7/141* (2013.01)
(58) Field of Classification Search
CPC ... B60J 7/14; B60J 7/141; B60J 7/1607; B60J 7/198; B60P 7/02
USPC .......................... 296/100.06, 100.07, 100.09
See application file for complete search history.

(56) References Cited

U.S. PATENT DOCUMENTS

| | | | | |
|---|---|---|---|---|
| 3,856,422 A * | 12/1974 | Trefry | ................... | F16B 21/078 403/122 |
| 4,520,546 A * | 6/1985 | Darnell | ................. | F16C 11/069 403/56 |
| 5,409,320 A * | 4/1995 | Maury | ................... | B60G 7/005 403/77 |
| 7,124,864 B2 * | 10/2006 | Jones | ...................... | F16B 2/185 403/397 |
| 10,960,745 B2 * | 3/2021 | Dylewski, II | ............ | B60J 7/141 |
| 11,299,021 B2 * | 4/2022 | Dylewski, II | ............ | B60J 7/198 |
| 2007/0253765 A1 * | 11/2007 | Knopp | ................ | F16C 11/0638 403/122 |
| 2016/0114666 A1 * | 4/2016 | Xu | ........................... | B60J 7/141 296/100.07 |
| 2017/0291478 A1 * | 10/2017 | Hall | ........................ | B60J 7/141 |

FOREIGN PATENT DOCUMENTS

CN          111114256 A       5/2020

* cited by examiner

*Primary Examiner* — Jason S Daniels
(74) *Attorney, Agent, or Firm* — Schwegman Lundberg & Woessner, P.A.

(57) ABSTRACT

A mounting structure for a pickup bed cover includes two mounting rods and a folding cover plate. The two mounting rods are in parallel, and the cover plate is fixed with the mounting rods together. The mounting structure for the pickup bed cover further includes a supporting rod, a first hinge seat and a second hinge seat. The first hinge seat is arranged on one of the mounting rods and the second hinge seat is arranged on the cover plate, one end of the supporting rod is fixedly hinged with the first hinge seat, and the other end of the supporting rod is detachably hinged with the second hinge seat. With one end of the supporting rod being fixedly hinged and the other end of the supporting rod being detachably hinged, a stable mounting structure is obtained and it is more convenient to mount.

16 Claims, 6 Drawing Sheets

MOUNTING STRUCTURE FOR PICKUP BED COVER

CROSS REFERENCE TO RELATED APPLICATION

This Non-provisional application claims priority under 35 U.S.C. § 119(a) to Chinese Patent Application No. 202221273494.7, filed on 24 May 2022, the entire contents of which is hereby incorporated by reference in its entirety.

TECHNICAL FIELD

The disclosure relates to a technical field of pickup trucks, in particular to a mounting structure for a pickup bed cover.

BACKGROUND ART

A pickup is a kind of economical and practical vehicle with beautiful appearance and strong power, especially with an open cargo container, which has more extensive practicability and modification space than cars. Currently, there are many cover products for open containers, especially hard three-fold covers which need to be folded when in use. The folded covers should not only be fixed, but also be easy to disassemble. A mounting structure for a pickup bed cover is disclosed in Patent CN111114256A in which a mounting structure for a supporting rod (reference number in the document is 805) has not been disclosed.

SUMMARY

In view of above problems, a mounting structure for a pickup bed cover with convenient installation and a stable structure is proposed in the present disclosure.

Technical schemes adopted in the disclosure are as follows.

The mounting structure for the pickup bed cover includes two mounting rods and a folding cover plate. The two mounting rods are in parallel, and the cover plate is fixed with the mounting rods together. The mounting structure for the pickup bed cover further includes a supporting rod, a first hinge seat and a second hinge seat. The first hinge seat is arranged on the mounting rods and the second hinge seat is arranged on the cover plate, one end of the supporting rod is fixedly hinged with the first hinge seat, and the other end of the supporting rod is detachably hinged with the second hinge seat.

In the mounting structure for the pickup bed cover of the disclosure, one end of the supporting rod is fixedly hinged with the first hinge seat and the other end of the supporting rod is detachably hinged with the second hinge seat, rotation can be made at both hinge points, and thus a certain level of rotation can be made with certain adaptability in supporting. Meanwhile, one of the hinge points is a fixed hinge point while the other of the hinge points is a detachable hinge point, and the cover plate can serve to cover by detaching at the second hinge point when the cover plate is to cover. In the mounting structure for the pickup bed cover, with one end of the supporting rod being fixedly hinged and the other end of the supporting rod being detachably hinged, a stable mounting structure is obtained and it is more convenient to mount.

Specifically, the folding cover plate has a structure which is unfolded when in use and is folded and stored when not in use, and the supporting rod is configured to support the folded cover plate.

Optionally, the first hinged seat is provided with a spherical hinge column, the second hinged seat is provided with a spherical hinge column, and two ends of the supporting rod are rotationally clamped and matched with the two spherical hinge columns respectively.

Optionally, a joint is respectively provided at the two ends of the supporting rod, the joint is made of soft glue, and the joint is provided with a clamping hole, and the spherical hinge column is matched with the clamping hole.

Specifically, there are two joints, namely, a first joint and a second joint. The first joint is fixedly hinged with the spherical hinge column on the first hinge seat, and the second joint is detachably hinged with the spherical hinge column on the second hinge seat.

In this application, an expression of "fixedly hinged" means that the first joint and the spherical hinge column on the first hinge seat are non-detachable structures, but the first joint can rotate around the spherical hinge column on the first hinge seat. And an expression of "detachably hinged" means that the second joint and the spherical hinge column on the second hinge seat are detachable structures, that is, the second joint can be separated from the spherical hinge column of the second hinge seat, and the second joint can rotate around the spherical hinge column of the second hinge seat.

Optionally, the spherical hinge column includes a column, a mounting seat, a conical section and a spherical head which are connected in sequence. An outer surface of the column is provided with threads, the first hinge seat and/or the second hinge seat are provided with a threaded copper insert, and the column is threadedly connected with the first hinge seat and/or the second hinge seat. Structural strength of threaded connections can be enhanced with the copper insert. The mounting seat is hexagonal, which facilitates fastening with various standard tools. The joint is clamped at a connection of the conical section and the spherical head, and the conical section is a structure with a gradually decreasing diameter towards the spherical head, so that the joint can rotate flexibly. The spherical head has a spherical structure, which is provided with a flat surface. The flat surface abuts against the joint. Compared with point contacting, a contacting area of a surface contacting is larger, the structural strength is higher, and the spherical head can be prevented from being worn when the joint rotates.

Optionally, two parallel blocking bars are arranged in the clamping hole, and the blocking bars are integrally formed with the joint.

Specifically, both the first joint and the second joint are provided with the clamping hole, the clamping hole on the second joint are provided with the blocking bars, and the two blocking bars in the clamping holes are in parallel, and the blocking bars specifically function to clamp the spherical hinge column so that the spherical hinge column will not slide out of the clamping hole.

Optionally, the mounting structure for the pickup bed cover further includes a bevel pusher block and a snap spring, the joint is provided with a chute, the snap spring is arranged on the joint, the bevel pusher block is arranged in the chute, the bevel pusher block is located between the joint and the snap spring, and an end of the bevel pusher block is located in the clamping hole.

Specifically, the chute is arranged on the second joint, and the bevel pusher block is located in the chute of the second joint. The function of the snap spring is to clamp the bevel pusher block in the chute of the second joint, and the end of the bevel pusher block is located in the clamping hole, so that the spherical hinge column can be extruded out of the clamping hole of the second joint only by pushing the bevel pusher block.

Optionally, the joint can be detachably matched with the supporting rod.

Specifically, both the first joint and the second joint are threadedly mounting on the supporting rod.

But this is not limited thereto, a first end of the supporting rod is clamped with the first joint through a clamping piece, and a second end of the supporting rod is connected with the second joint through a threaded structure. Specifically, the first end of the supporting rod is provided with a first slot, the first joint is provided with a jack and a second slot, the first end of the supporting rod is inserted into the jack, and the first slot face the second slot. The clamping piece is inserted into the first slot and the second slot, thereby connecting the first end of the supporting rod with the first joint. The first slot is an annular slot, which is easy to align with the second slot, facilitating insertion and clamping of the clamping piece, and the supporting rod can rotate circumferentially, which facilitates circumferential adjusting of the supporting rod for connection with the first joint/second joint. The clamping piece is provided with two clamping arms, and clamping ends of the two clamping arms are provided with introduction bevels for extending into the second slot, and are matched and clamped with an inner wall of the first joint by elastic forces of the two clamping arms. The clamping piece is provided with a bent shank portion, so that the clamping piece can be conveniently plugged and unplugged by hand.

Optionally, the first hinge seat is mounted on the mounting rod by bolts, and the second hinge seat is mounted on the cover plate by bolts.

Optionally, the supporting rod is a cylindrical metal supporting rod.

Optionally, the mounting rod is also provided with a recycling component, which is arranged at intervals with the first hinge seat, and a length of the supporting rod is not greater than a distance between the recycling component and the first hinge seat. The recycling component includes a recycling seat and recycling spring plate. The recycling spring plate is mounted on the recycling seat by bolts, and the recycling spring plate is provided with a recycling groove matched with an outer wall of the supporting rod. When the supporting rod does not support the cover plate, it can be clamped into and received in the recycling groove. The recycling seat is provided with two opposite retaining arms, which are respectively arranged on both sides of the recycling spring plate to prevent the recycling spring plate from rotating. The recycling spring plate is provided with a smooth arc face at a notch of the recycling groove, with a smooth action of the supporting rod clamping into or disengaging from the recycling groove.

The disclosure has advantages as follows: with one end of the supporting rod being fixedly hinged and the other end of the supporting rod being detachably hinged, a stable mounting structure is obtained and it is more convenient to mount.

DETAILED DESCRIPTION

The present disclosure will be described in detail with reference to the accompanying drawings.

Figure 1:
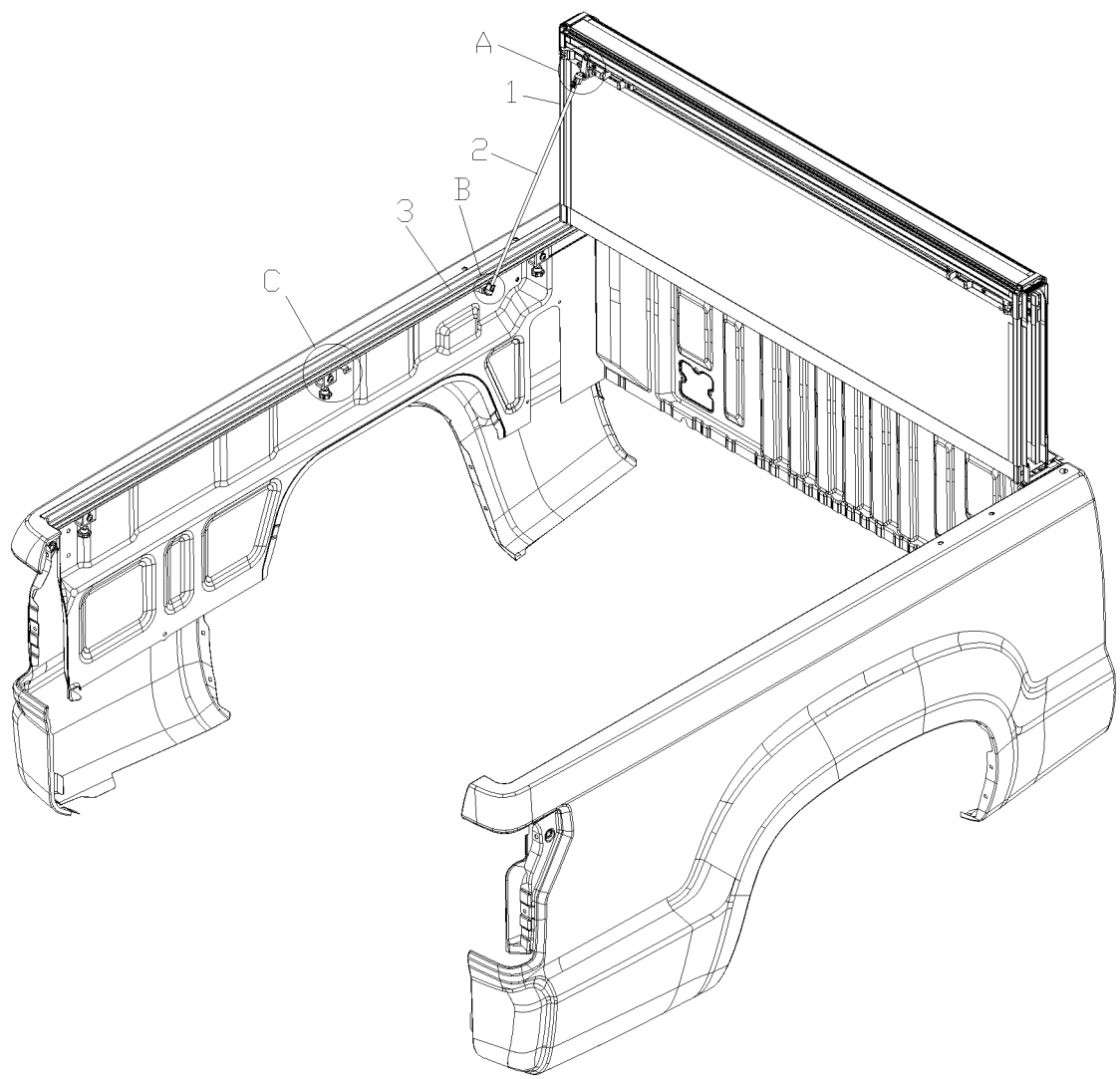
FIG. 1 is a schematic diagram of a mounting structure for a pickup bed cover.
Figure 2:
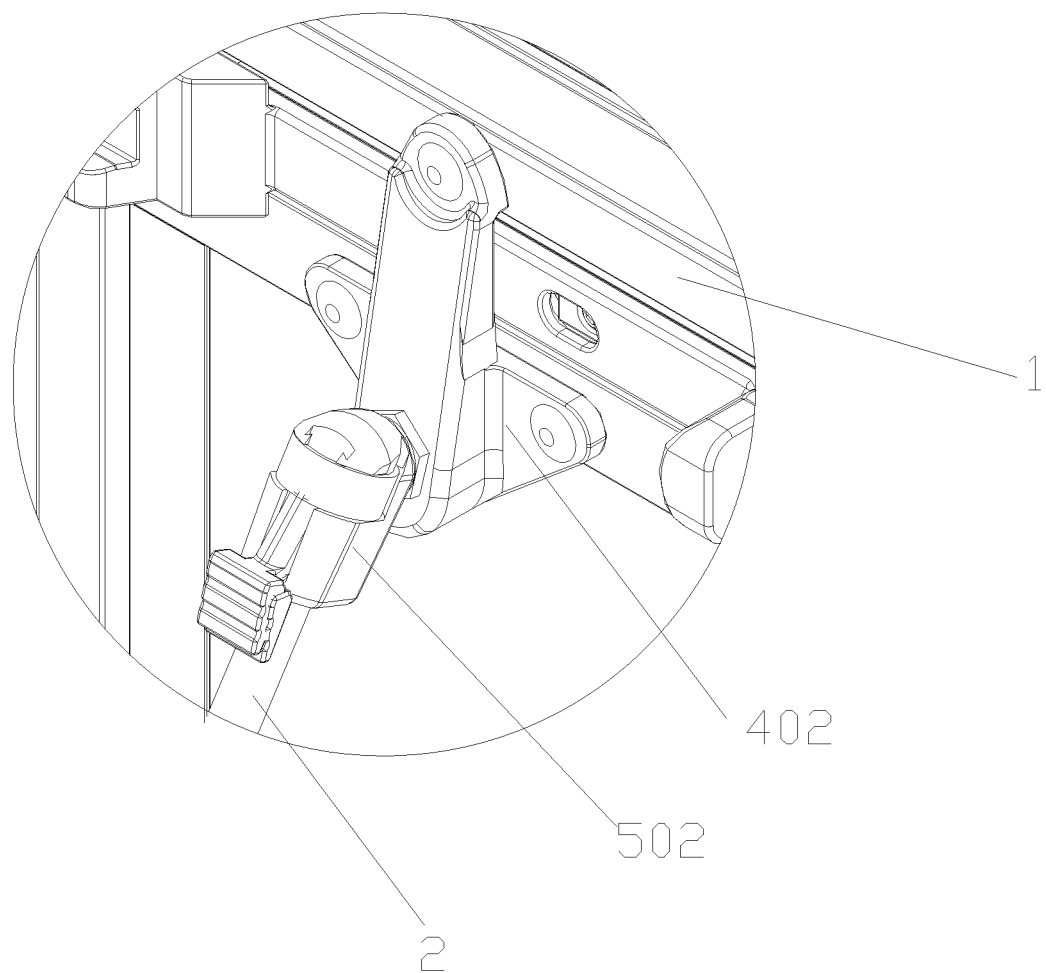
FIG. 2 is an enlarged schematic diagram at A in FIG. 1.
Figure 3:
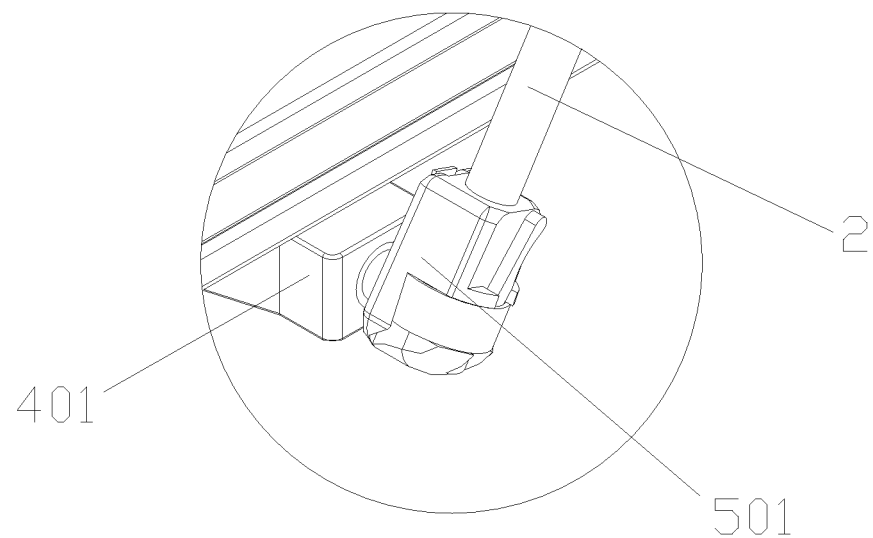
FIG. 3 is an enlarged schematic diagram at B in FIG. 1.

As shown in FIGS. 1 to 3, the mounting structure for the pickup bed cover according to this disclosure includes two mounting rods 3 and a folding cover plate 1. The two mounting rods 3 are in parallel, and the cover plate 1 is fixed with the mounting rods 3 together. The mounting structure for the pickup bed cover further includes a supporting rod 2, a first hinge seat 401 and a second hinge seat 402. The first hinge seat 401 is arranged on the mounting rods 3 and the second hinge seat 402 is arranged on the cover plate 1, one end of the supporting rod 2 is fixedly hinged with the first hinge seat 401, and the other end of the supporting rod 2 is detachably hinged with the second hinge seat 402.

In the mounting structure for the pickup bed cover of the disclosure, one end of the supporting rod 2 is fixedly hinged with the first hinge seat 401 and the other end of the supporting rod 2 is detachably hinged with the second hinge seat 402, rotation can be made at both hinge points, and thus a certain level of rotation can be made with certain adaptability in supporting. Meanwhile, one of the hinge points is a fixed hinge point while the other of the hinge points is a detachable hinge point, and the cover plate 1 can serve to cover by detaching at the second hinge point when the cover plate 1 is to cover.

To sum up, in the mounting structure for the pickup bed cover, with one end of the supporting rod 2 being fixedly hinged and the other end of the supporting rod 2 being detachably hinged, a stable mounting structure is obtained and it is more convenient to mount.

As shown in FIGS. 2 to 5, the first hinge seat 401 is provided with a spherical hinge column 6, the second hinge seat 402 is provided with a spherical hinge column 6, and two ends of the supporting rod 2 are rotationally clamped and matched with the two spherical hinge columns 6 respectively.

As shown in FIGS. 2, 3, 6 and 7, a joint is respectively provided at the two ends of the supporting rod 2, the joint is made of soft glue, and the joint is provided with a clamping hole 5023, and the spherical hinge column 6 is matched with the clamping hole 5023.

Specifically, there are two joints, namely, a first joint 501 and a second joint 502. The first joint 501 is fixedly hinged with the spherical hinge column 6 on the first hinge seat 401, and the second joint 502 is detachably hinged with the spherical hinge column 6 on the second hinge seat 402.

Figure 4:
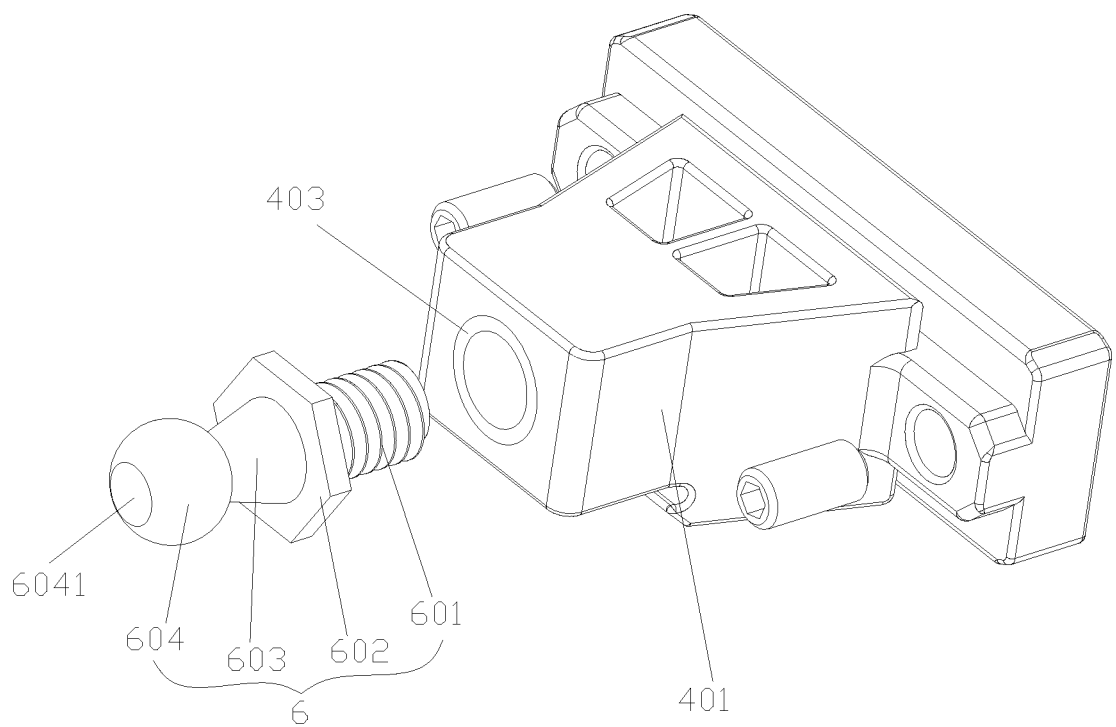
FIG. 4 is a structural diagram of a first hinge seat.
Figure 5:
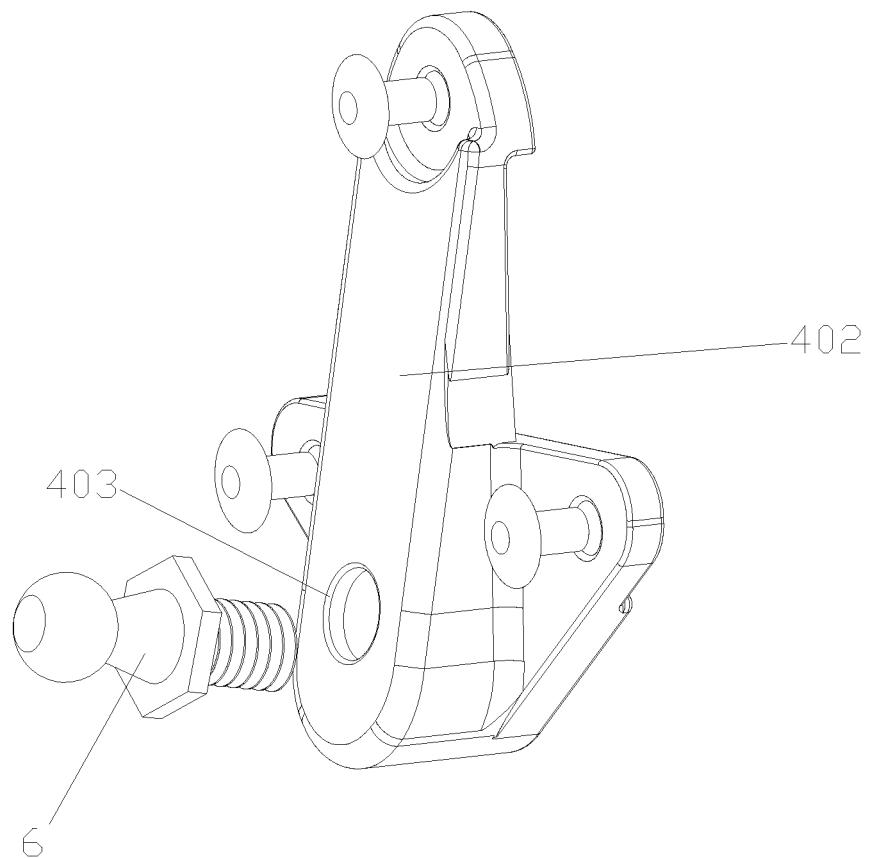
FIG. 5 is a structural diagram of a second hinge seat.

As shown in FIGS. 4 and 5, the spherical hinge column includes a column 601, a mounting seat 602, a conical section 603 and a spherical head 604 which are connected in sequence. An outer surface of the column 601 is provided with threads, the first hinge seat 401 and/or the second hinge seat 402 are provided with a threaded copper insert 403, and the column 601 is threadedly connected with the first hinge seat 401 and/or the second hinge seat 402. Structural strength of threaded connections can be enhanced with the copper insert 403. The mounting seat 602 is hexagonal, which facilitates fastening with various standard tools. The joint is clamped at a connection of the conical section 603 and the spherical head 604, and the conical section 603 is a structure with a gradually decreasing diameter towards the spherical head 604, so that the joint can rotate flexibly. The spherical head 604 has a spherical structure, which is provided with a flat surface 6041. The flat surface 6041 abuts against the joint. Compared with point contacting, a contacting area of a surface contacting is larger, the structural strength is higher, and the spherical head 604 can be prevented from being worn when the joint rotates.

Figure 7:
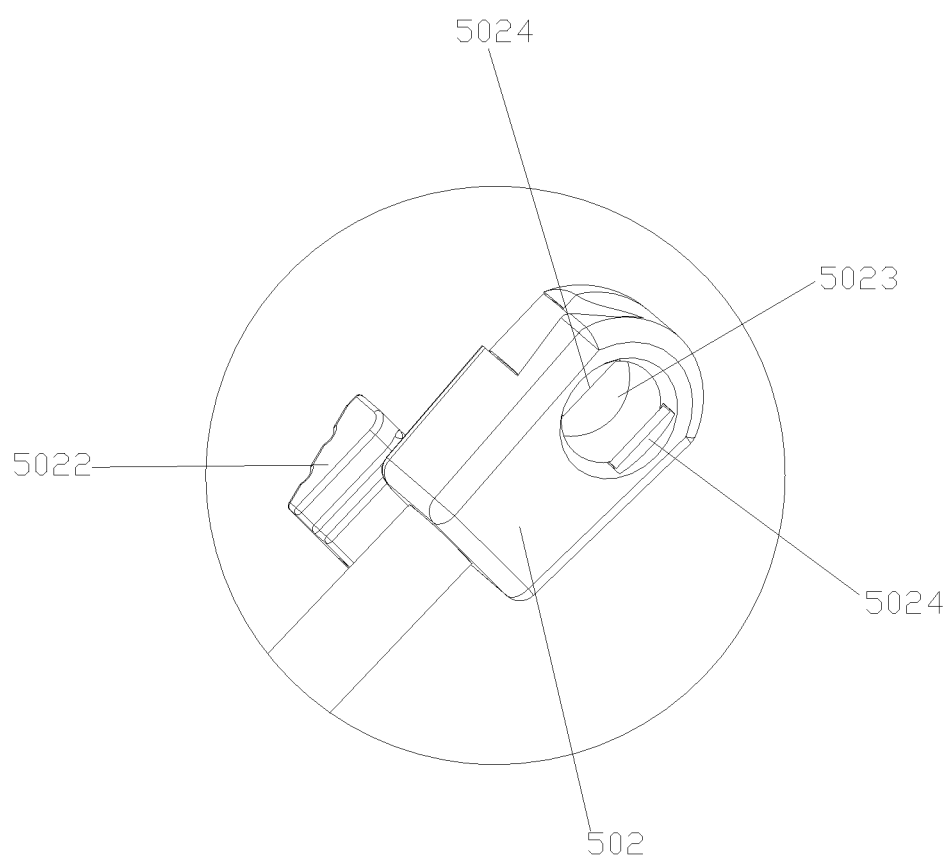
FIG. 7 is a schematic diagram of a connection relationship between the second joint and the supporting rod.

As shown in FIG. 7, two parallel blocking bar 5024 are arranged in the clamping hole 5023, and the blocking bars 5024 are integrally formed with the joint.

Specifically, both the first joint 501 and the second joint 502 are provided with the clamping hole 5023, the clamping hole 5023 on the second joint 502 are provided with the blocking bars 5024, and the two blocking bars 5024 in the clamping holes 5023 are in parallel, and the blocking bars 5024 specifically function to clamp the spherical hinge column 6 so that the spherical hinge column 6 will not slide out of the clamping hole 5023.

Figure 6:
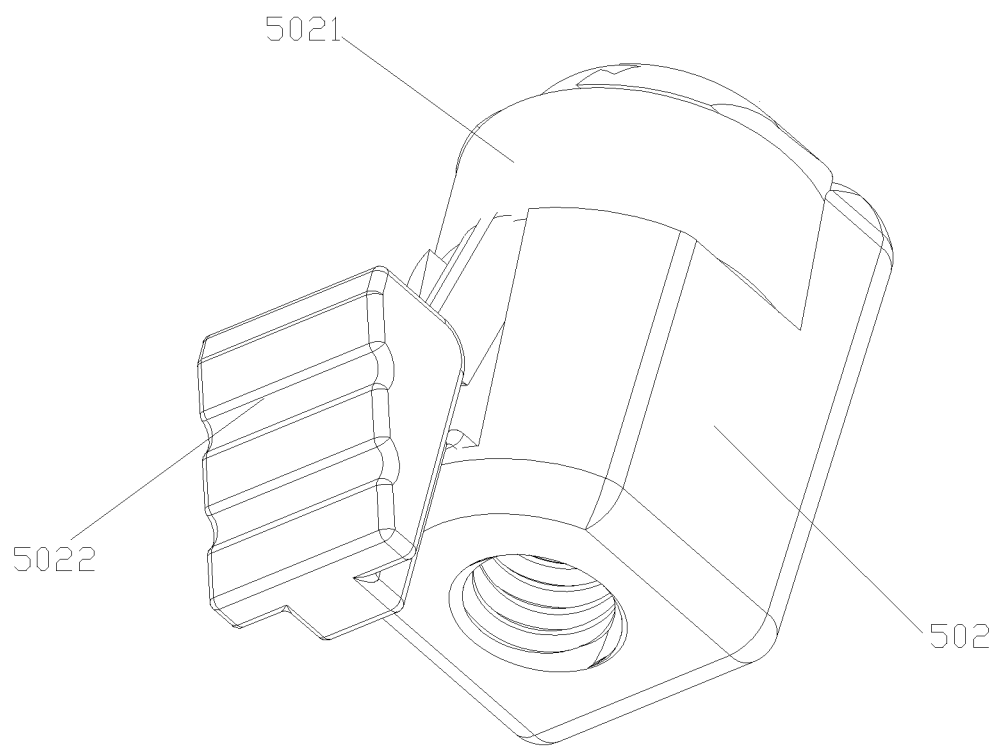
FIG. 6 is a structural diagram of a second joint.

As shown in FIGS. 6 and 7, the mounting structure for the pickup bed cover further includes a bevel pusher block 5022 and a snap spring 5021, the joint is provided with a chute, the snap spring 5021 is arranged on the joint, the bevel pusher block 5022 is arranged in the chute, the bevel pusher block 5022 is located between the joint and the snap spring 5021, and an end of the bevel pusher block 5022 is located in the clamping hole 5023.

Specifically, the chute is arranged on the second joint 502, and the bevel pusher block 5022 is located in the chute of the second joint 502. The function of the snap spring 5021 is to clamp the bevel pusher block 5022 in the chute of the second joint 502, and the end of the bevel pusher block 5022 is located in the clamping hole 5023, so that the spherical hinge column can be extruded out of the clamping hole 5023 of the second joint 502 only by pushing the bevel pusher block 5022.

As shown in FIGS. 2 and 3, the joint can be detachably matched with the supporting rod 2.

Specifically, a first end 201 of the supporting rod is clamped with the first joint 501 through a clamping piece 7, and a second end 202 of the supporting rod is connected with the second joint 502 through a threaded structure.

Figure 8:
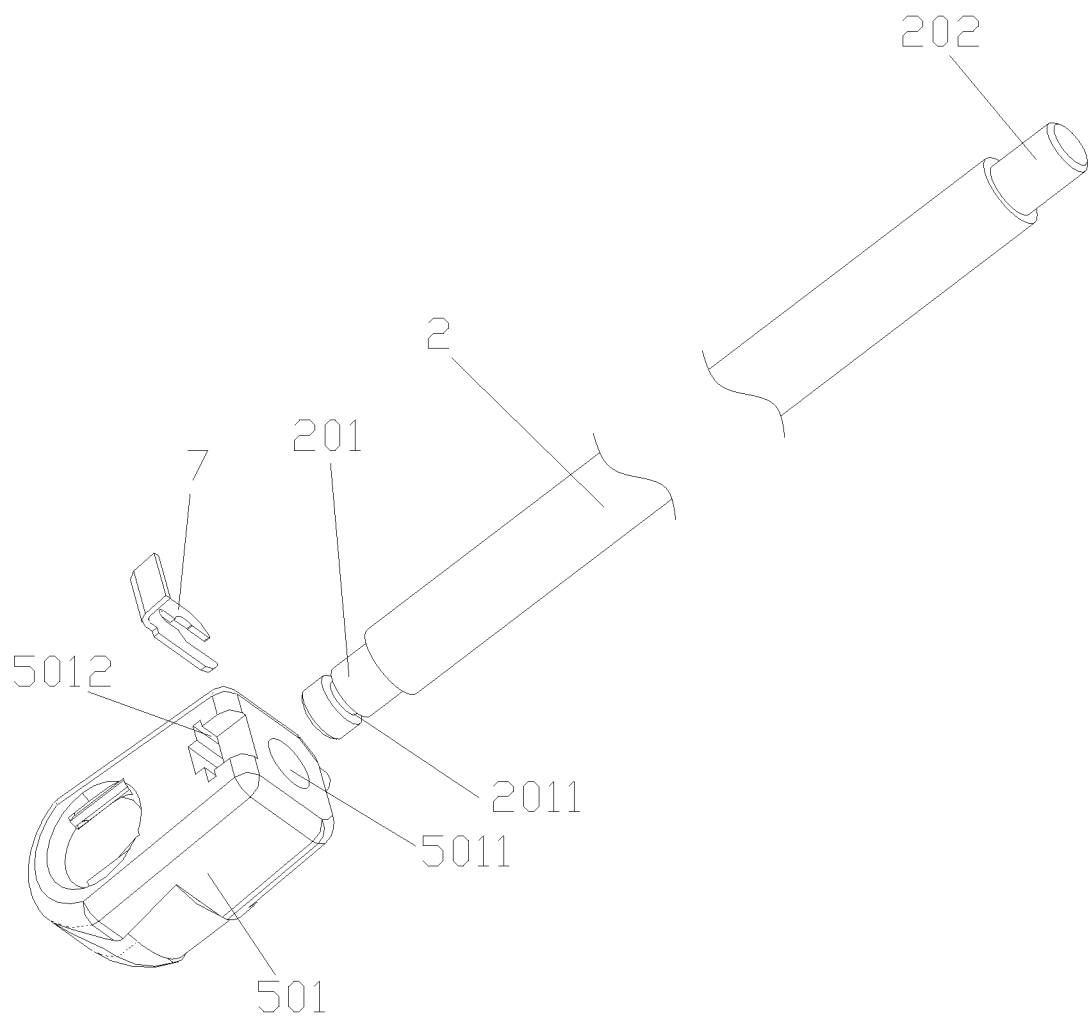
FIG. 8 is an exploded diagram of the connection between the supporting rod and a first joint.
Figure 9:
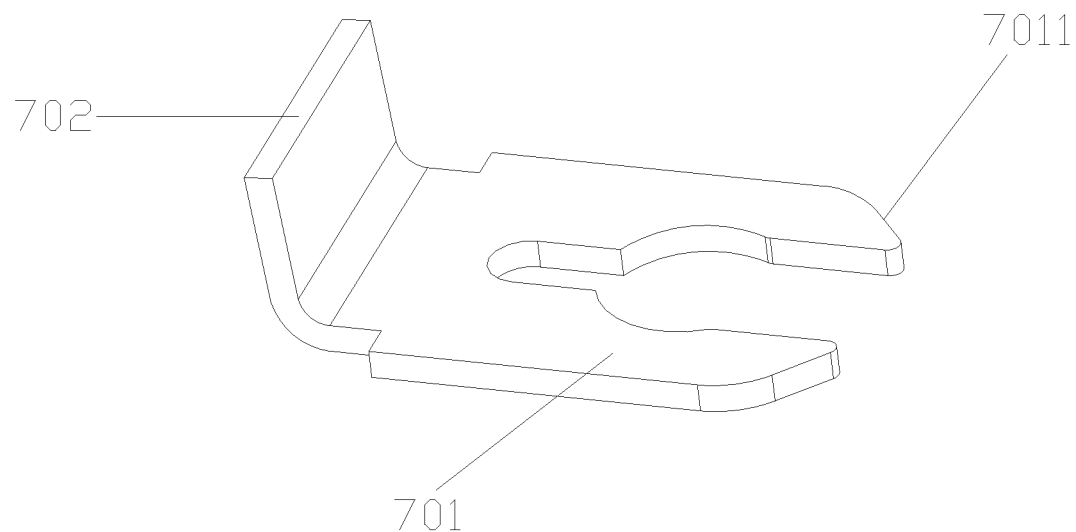
FIG. 9 is a schematic diagram of a clamping piece.

As shown in FIGS. 8 and 9, the first end 201 of the supporting rod is provided with a first slot 2011, the first joint 501 is provided with a jack 5011 and a second slot 5012, the first end 201 of the supporting rod is inserted into the jack 5011, and the first slot 2011 face the second slot 5012. The clamping piece 7 is inserted into the first slot 2011 and the second slot 5012, thereby connecting the first end 201 of the supporting rod with the first joint 501. The first slot 2011 is an annular slot, which is easy to align with the second slot 5012, facilitating insertion and clamping of the clamping piece 7, and the supporting rod 2 can rotate circumferentially, which facilitates circumferential adjusting of the supporting rod 2 for connection with the first joint 501/second joint 502. The clamping piece 7 is provided with two clamping arms 701, and clamping ends of the two clamping arms 701 are provided with introduction bevels 7011 which facilitate extending into the second slot 5012, and are matched and clamped with an inner wall of the first join 501 by elastic forces of the two clamping arms 701. The clamping piece 7 is provided with a bent shank portion 702, so that the clamping piece 7 can be conveniently plugged and unplugged by hand.

As shown in FIGS. 1 to 3, the first hinge seat 401 is mounted on the mounting rod 3 by bolts, and the second hinge seat 402 is mounted on the cover plate 1 by bolts.

As shown in FIG. 1, the supporting rod 2 is a cylindrical metal supporting rod 2.

Figure 10:
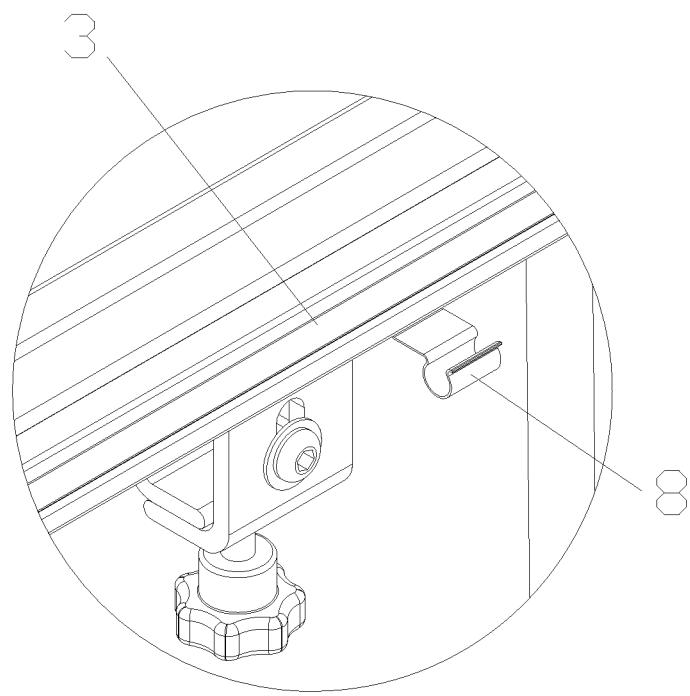
FIG. 10 is an enlarged schematic diagram at C in FIG. 1.
Figure 11:
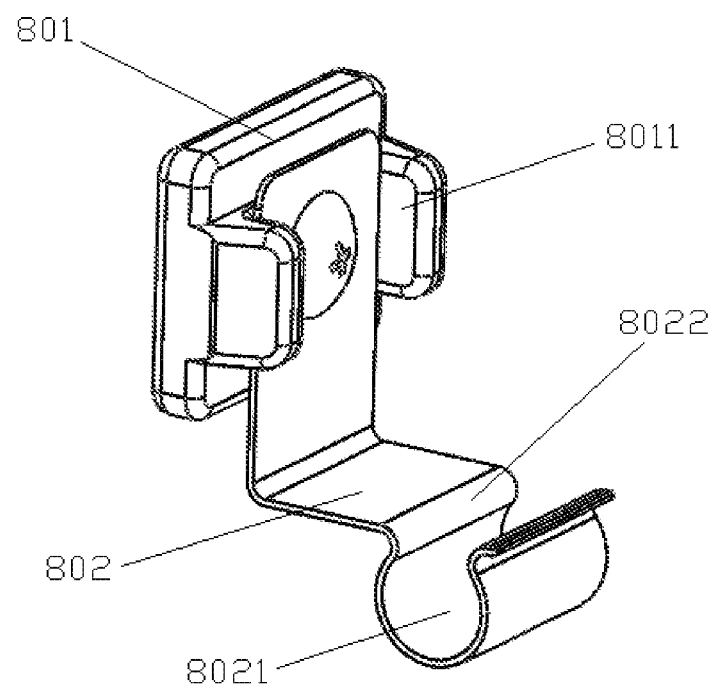
FIG. 11 is a schematic diagram of a recycling component.

As shown in FIGS. 10 and 11, the mounting rod 3 is also provided with a recycling component 8, which is arranged at intervals with the first hinge seat 401, and a length of the supporting rod 2 is not greater than a distance between the recycling component 8 and the first hinge seat 401. The recycling component 8 includes a recycling seat 801 and recycling spring plate 802. The recycling spring plate 802 is mounted on the recycling seat 801 by bolts, and the recycling spring plate 802 is provided with a recycling groove 8021 matched with an outer wall of the supporting rod 2. When the supporting rod 2 does not support the cover plate 1, it can be clamped into and received in the recycling groove 8021. The recycling seat 801 is provided with two opposite retaining arms 8011, which are arranged on both sides of the recycling spring plate 802 to prevent the recycling spring plate 802 from rotating. The recycling spring plate 802 is provided with a smooth arc face 8022 at a notch of the recycling groove 8021, with a smooth action of the supporting rod 2 clamping into or disengaging from the recycling groove 8021.

The above is only preferred embodiments of the present disclosure, which does not limit a protection scope of the present disclosure. Any equivalent transformation made with the specification of the present disclosure, which is directly or indirectly applied to other related technical fields, is included within the scope of the disclosure.

What is claimed is:

1. A mounting structure for a pickup bed cover, comprising two mounting rods and a folding cover plate, wherein the two mounting rods are in parallel, and the cover plate is fixed with the mounting rods together; and the mounting structure for the pickup bed cover further comprises a supporting rod, a first hinge seat and a second hinge seat, the first hinge seat is arranged on one of the mounting rods and the second hinge seat being arranged on the cover plate, one end of the supporting rod being fixedly hinged with the first hinge seat, and the other end of the supporting rod being detachably hinged with the second hinge seat;

wherein the first hinge seat is provided with a spherical hinge column, the second hinged seat is provided with a spherical hinge column, and two ends of the supporting rod are rotationally clamped and matched with the two spherical hinge columns respectively;

wherein a joint is respectively provided at two ends of the supporting rod—and the joint is provided with a clamping hole, and the spherical hinge column is matched with the clamping hole;

wherein two parallel blocking bars are arranged in the clamping hole, and the blocking bars are integrally formed with the joint.

2. The mounting structure for the pickup bed cover according to claim 1, further comprising a bevel pusher block and a snap spring, the joint being provided with a chute, wherein the snap spring is arranged on the joint, the bevel pusher block is arranged in the chute, the bevel pusher block is located between the joint and the snap spring, and an end of the bevel pusher block is located in the clamping hole.

3. The mounting structure for the pickup bed cover according to claim 1, wherein the joint can be detachably matched with the supporting rod.

4. The mounting structure for the pickup bed cover according to claim 3, wherein the joint comprises a first joint and a second joint, a first end of the supporting rod is clamped with the first joint through a clamping piece, and a second end of the supporting rod is connected with the second joint through a threaded structure.

5. The mounting structure for the pickup bed cover according to claim 4, wherein the first end of the supporting rod is provided with a first slot, the first joint is provided with a jack and a second slot, the first end of the supporting rod is inserted into the jack, and the first slot face the second slot; the clamping piece is inserted into the first slot and the second slot, so as to connect the first end of the supporting rod with the first joint.

6. The mounting structure for the pickup bed cover according to claim 5, wherein the first slot is an annular slot.

7. The mounting structure for the pickup bed cover according to claim 5, wherein the clamping piece is provided with two clamping arms, and clamping ends of the two clamping arms are provided with introduction bevels for extending into the second slot.

8. The mounting structure for the pickup bed cover according to claim 1, wherein the first hinge seat is mounted on the mounting rod by bolts, and the second hinge seat is mounted on the cover plate by bolts.

9. The mounting structure for the pickup bed cover according to claim 1, wherein the supporting rod is a cylindrical metal supporting rod.

10. The mounting structure for the pickup bed cover according to claim 3, wherein the spherical hinge column comprises a column, a mounting seat, a conical section and a spherical head which are connected in sequence, an outer surface of the column being provided with threads for connecting with the first and second hinge seats, the conical section being a structure with a gradually decreasing diameter towards the spherical head, and the joint being clamped at a connection of the conical section and the spherical head.

11. The mounting structure for the pickup bed cover according to claim 10, wherein the spherical head is provided with a plane abutting against the joint.

12. The mounting structure for the pickup bed cover according to claim 1, wherein the mounting rod is further provided with a component for receiving the supporting rod, and the recycling component is arranged at intervals with the first hinge seat.

13. The mounting structure for the pickup bed cover according to claim 12, wherein a length of the supporting rod is not greater than a distance between the recycling component and the first hinge seat.

14. The mounting structure for the pickup bed cover according to claim 12, wherein the recycling component comprises a recycling seat and a recycling spring plate arranged on the recycling seat, the recycling spring plate being provided with a recycling groove matched with an outer wall of the supporting rod.

15. The mounting structure for the pickup bed cover according to claim 14, wherein the recycling seat is provided with two retaining arms, the two retaining arms being respectively arranged on both sides of the recycling spring plate.

16. The mounting structure for the pickup bed cover according to claim 14, wherein the recycling spring plate is provided with a smooth arc face at a notch of the recycling groove.

* * * * *